United States Patent Office 3,775,352
Patented Nov. 27, 1973

3,775,352
METAL-POLYMER MATRICES AND THEIR PREPARATION
William J. Leonard, Jr., San Francisco, Calif., assignor to Shell Oil Company, Houston, Tex.
No Drawing. Filed Mar. 22, 1971, Ser. No. 126,982
Int. Cl. C08f 29/34, 45/02, 47/08
U.S. Cl. 260—2.5 B                    7 Claims

ABSTRACT OF THE DISCLOSURE

High surface area organic matrix polymers containing metals or metal oxides are produced by thermally decomposing porous Group IIIb–Va metal ion chain-bridged polymeric carboxylates at temperatures of from about 100° C. to 450° C. The metal-metal oxide organic matrix polymers thus produced have surface areas and pore volumes similar to those of the starting ion-linked porous polymeric carboxylates and are characterized by metal or metal oxide present as extremely fine (less than 2000 A.) particles. The products are useful in applications where fine particles of metal are desired, especially as catalysts.

BACKGROUND OF THE INVENTION

Field of the invention

This invention relates to high surface area metal- and/or metal oxide-containing organic polymers and a method for their production. More particularly it relates to the production of rigid porous polymeric products which comprise 2000 A. or smaller particles of metals or metal oxides arranged in organic polymer matrices.

The prior art

In many applications, such as in heterogeneous catalysts and in electronic apparatus, finely divided metals or metal oxides are employed.

Known processes for preparing particulate metals have limitations. For example, grinding and other modes of physical attrition, even by the most sophisticated methods, cannot produce metal particles smaller than about 1 micron (10,000 A.). If reducable metal salts are reduced in a dry state they similarly form large particles of low surface area bulk metal generally having particle sizes similar to the starting salt particles. Likewise, chemical precipitation of metals by reduction of metal salts in aqueous or liquid organic solution does not produce particles appreciably finer than about 10,000 A., apparently since the energy of smaller nascent metal particles is so high that they inherently agglomerate to this about 10,000 A. size.

Another method for forming particles of metal is to incorporate a metal salt in a polymeric binder and then reduce. Such a process is described by Natanson et al., in the 1968 volume of the Russian journal Fiz Khim Mekh, pp. 174–177, wherein a mixture of silver formate and polystyrene was decomposed to generate silver particles. This product would have essentially no micropores, the bulk of the inner silver particles being encapsulated and inaccessible. U.S. Pats. 3,073,784, issued Jan. 15, 1963, to Endry and 3,073,785, issued Jan. 15, 1963, to Angelo describe another type of metal-containing polymer. These patents disclose metal particle-containing flexible polyamide compositions. Like the present invention, these materials are formed by thermally decomposing metal salts (in these patents, salts of polyamide-acids). The resulting metal-containing polymer however, are substantially different in physical form from those of the present invention, being flexible and non-porous instead of being rigid, porous and of high surface area.

STATEMENT OF THE INVENTION

It has now been found that certain porous metal-coordinated polymeric carboxylates thermally decarboxylate to produce, rigid porous, high surface area organic polymer matrices containing 50 A to 1000 A particles of metals or metal oxides in the intersticies. The metal/metal oxide particle-containing matrix products of this invention have high surface areas (10–600 m.$^2$/g.) and are therefore useful in a variety of applications which call for finely particulated metals or metal oxides, for example, in the production of magnetic recording tapes and especially as catalysts.

DETAILED DESCRIPTION OF THE INVENTION

The compositions of this invention comprise organic polymeric matrices having relatively small (50–1000 A.) particles of certain metals or metal oxides in their intersticies. The organic polymer matrices are dicarboxylated polymers of unsaturated carboxylic acids. The metals or metal oxides are Group IIIb–Va metals and their oxides.

STARTING MATERIALS

The compositions of this invention are prepared by thermally decarboxylating certain porous metal ion chain-bridged polymerized unsaturated carboxylic acids. These metal-ion-linked acids and their preparation are fully described in U.S. Ser. No. 126,736, of Leonard, filed of even date and entitled Metal-Containing Polymers. Briefly, the metal ion polyacid polymer starting materials comprise Group IIIa-Vb metal-ion-coordinated salts of polymerized hydrocarbon carboxylic acids. The polymerized carboxylic acid precursor is derived solely from hydrocarbon carboxylic acid monomers possessing at least one carboxy group and at least one ethylenic linkage per monomeric unit.

The acids may also contain additional carbon-carbon unsaturation in the molecules, such as, aromatic unsaturation. Suitable acids include, for example, vinylhydrogenphthalate, vinyl benzoic acid, acrylic acid and maleic acid.

As used herein, the term Group IIIb–Va metal are those depicted in with the Periodic Table of the Elements found in the 49th edition of the Chemical Rubber Corporation Handbook of Chemistry and Physics. Included are those metals termed transition metals, i.e., the metals, in periodic sequence, from scandium to zinc, from yttrium to cadmium and from lanthanum to mercury; as well as metals of Group IIIa including aluminum, gallium indium and thallium; metals of Group IVa including silicon, germanium, tin and lead, and metals of Group Va including arsenic, antimony and bismuth.

Preferred as starting materials are the Group IIIb–Va metal ion-linked salts of polymerized lower ethylenically unsaturated acids which contain from one to two carboxy groups, and from one to two ethylenic linkages as the sole carbon-carbon unsaturation and contain from three to six carbon atoms, including carboxy carbon atom(s), per monomeric unit, for example, acrylic acid, maleic acid, fumaric acid, sorbic acid, crotoic acid and the like. Especially preferred starting materials are salts of one or more Group IIIb–IVa metals having atomic numbers of from 13 to 50 inclusive and polymerized monocarboxylic alkenoic acids of from three to six carbon atoms. Examples of these preferred materials include the aluminum, titanium, zirconium, vanadium, molybdenum, tungsten, chromium, manganese, iron, cobalt, nickel, copper, palladium, and silver ion-linked salts of polymerized (500–2,000,000 average molecular weight) acrylic acid, methacrylic acid, crotonic acid, 3-pentonic acid, sorbic acid 2-methyl-2-butenoic acid and ethacrylic acid. Most preferred polymeric acids, for employment in the starting materials are 2,000–500,000 average molecular weight polymers of acrylic acid and alpha-alkyl derivatives thereof wherein the alkyl has from one to three carbon atoms. The molecular weight upper limit is not critical, being limited primarily because of ease of handling these lower weight materials. The starting materials generally contain from 0.1 to 1.0 mole of metal ion per equivalent of acid. With monovalent metal ions, the starting materials preferably contain from 0.3 to about 1.0 equivalent of metal ion per equivalent of polyacid. With divalent metal ions, the starting materials preferably contain from 0.3 to about 2.0 equivalents of metal ion per equivalent of polyacid, while with trivalent metal ions the preferred ion content is from 0.3 to about 3.0 equivalents of metal ion per equivalent of polyacid.

One method for preparing these starting materials comprises the steps of (A) combining a generally dilute (preferably 0.05 to 1.0 molar) non-aqueous solution of suitable polymerized acid with from 0.2 to 5 equivalents, per equivalent of polyacid, of ions of one or more Group IIIb–Va metals, at a temperature in the range of 0–100° C.; (B) separating the gelatinous precipitate of amorphous metal-ion-linked polymer which results from the reaction solvent; and (C) removing residual solvent from the amorphous polymer such as by heat or vacuum, thus producing the rigid porous metal ion chain-bridged starting material. This starting material is then decarboxylated by the process described hereinbelow.

The exact mechanism involved in the reaction of the metal ions with the polyacid to form the starting materials is not known with certainty. It is known, however, that the metal ions, when added, react with the polymeric acids to a major extent intramolecularly, thus forming tiny particles of metal-polyacid complex. These particles then agglomerate to form the gelatinous intermediate material. The polyacid-metal starting materials which result after residual solvent removal are rigid, non-fusible and insoluble in water and other common solvents such as dioxane, and dimethylsulfoxide. They are porous, having specific surface areas of at least 5 m.$^2$/g., preferably from 15 to 600 m.$^2$/g, most preferably from 50 to 400 m.$^2$/g., as measured by the B.E.T. method. This method is described in detail in Brunauer, S., Emmet, P. H., and Teller, E., J. Am. Chem. Soc., 60, 309–16 (1938).

The last step of the preparation processes, i.e., the removal of residual solvent is somewhat optional. It is, except in matters of degree, similar to the decomposition which follows to produce the organic matrix final product. It is, therefore, possible to combine the residual solvent removal step with the decomposition by directly exposing the gelatinous metal-ion-polyacid intermediate product to decarboxylation temperatures. If such a practice is followed, small particles of metal result but the surface areas of the decomposition products is often somewhat reduced. This practice can present certain hazards as often-flammable organic solvents are exposed to high temperatures. It is generally preferred to stepwise remove residual solvent and then decarboxylate.

THE DECOMPOSITION

The porous organic matrix powdered metal products of this invention are prepared by heating the polyacid-metal ion starting materials to a temperature in the range of from 100 to 450° C. At these temperatures, the polyacid salt decarboxylates to afford a substantially carbonaceous organic matrix. The metal ions are simultaneously converted to tiny particles of either metals or metal oxides. It is preferred to carry out the decarboxylation at temperatures in the range of from 150 to 450° C. The optimum temperature is dependent on the metals present. For example, when silver is present as the only metal, temperatures of from 175 to 250° C. are most preferred; with aluminum, 275 to 450° C.; with nickel, 250 to 350° C.; with zinc 275 to 375° C.; with nickel and aluminum, 325 to 400° C., and with palladium and aluminum from 125 to 200° C., to give palladium metal or up to about 450° C. to give palladium metal and aluminum oxide.

Whether metal oxides or metals are formed by the process depends on both the environment of the thermal decarboxylation and the metals involved. The decarboxylation can be carried out in an oxygen-containing environment, for example, in air; in an inert environment such as in nitrogen or argon or in a vacuum; or in a reducing atmosphere such as hydrogen. With any of the metals employed, oxide particles are formed if an oxygen-containing environment is employed. It is recognized, however, that with gold, silver, mercury and the platinum metals, any oxide formed is unstable and thus may spontaneously decompose at the decarboxylation conditions to give metal, even with an oxygen environment. With active metals, that is metals having a standard oxidation potential, as reported in W. M. Latimer, The Oxidation States of the Elements and Their Potentials in Aqueous Solutions (1938), higher than about 0.4 v., such as chromium, iron, zinc, aluminum, and titanium, oxide particles are formed even in the substantial absence of an oxygen-containing environment. These metals apparently abstract oxygen from the starting polyacid material during the decarboxylation to form oxides.

Less active metals, that is metals having a oxidation potential lower than about 0.4 v., for example, copper, nickel, and cobalt, form particles of metallic metals, in an inert atmosphere, in a vacuum, or in a reducing atmosphere.

When preparing metal particles in a vacuum it is very convenient to employ absolute pressures up to about 100 mm. of mercury. The exact pressure selected within this range is not critical.

The length of time required to decompose the polymeric acid-metal matrix in part depends on the temperature employed. Times of up to about 12 hours are generally suitable.

THE PRODUCTS

The products of this invention are powders; the individual particles of which comprise rigid organic matrices containing minute crystals of one or more metals and/or metal oxides. Mixed metals may be present as alloys. The organic matrices are hydrocarbons or oxyhydrocarbons. These products contain a major proportion of metal or metal oxide suitably at least 10% by weight and preferably at least about 25% by weight. Examination of these products by X-ray diffraction and electron microscope indicates that the metal particles within the matrices are generally less than about 1000 A. in diameter (usually from 50–300 A.) in diameter. It is possible that even smaller metal or oxide particles are being produced by the process of the invention. However, present X-ray analytical techniques cannot detect particles smaller than about 50 A. with any degree of certainty. The products have high surface areas, essentially similar to those of the high surface area polyacid-metal materials, that is, from about 10 to 600 m.$^2$/g.

UTILITY OF THE PRODUCTS

The metal-metal-oxide containing products of this invention are useful in the variety of applications which require finely divided metals or metal oxides. For example, certain of the products such as iron oxide-containing products, may be used in magnetic tapes and inks. Others may be blended with polymers to change the polymers' electrical properties. In a preferred application, these products are used as heterogeneous catalysts, either in supported or unsupported form. For example, palladium-containing materials find application as hydrogenation catalysts and as catalysts for the dehydrogenation of primary and secondary alcohols to aldehydes and ketones. Nickel- and cobalt-containing materials are effective as hydrogenation catalysts. Silver-containing materials find application as catalysts in a number of chemical reactions including hydrogenation, cracking, dehydrogenation and in the production of ethylene oxide by the direct partial oxidation of ethylene. Alumina-containing products are effective as hydrocarbon cracking catalysts.

The invention will be described by the following examples which are provided for illustration and are not to be construed as limiting the invention.

EXAMPLE I (A) Two polyacrylic acid feedstocks were prepared by heating a dioxane solution of acrylic acid with measured amounts of azobisisobutyronitrile and azobiscyclohexanenitrile. These feedstocks had average molecular weights, as determined by viscosity measurement, of $1 \times 10^4$ and $1 \times 10^6$. They were used interchangeably in the examples which follow.

(B) A solution of 0.21 equivalent of polyacrylic acid in 4 liters of dioxane was combined with stirring over a 150 minute period with a solution of 0.12 mole of cobalt octanoate in 1.5 liters of dioxane. The temperature was 24° C. A gelatinous mass of precipitate formed and was centrifuged from the bulk of the solvent. The precipitate was washed several times with dioxane to remove unreacted metal salts. Occluded solvent was removed to dryness to give 21 grams of porous powder product containing 23.8% w. cobalt.

(C) A sample of the product of part (B) was then thermally decomposed by heating in vacuo at 425° C. for 10 hours. A 55% weight loss was noted. The resulting product in accord with this invention was a rigid powder which contained about 53% by weight of cobalt as 100 A. particles as determined by X-ray diffraction. It had a surface area of 127 m.$^2$/g., and a pore volume of 0.25 cc./g.

EXAMPLE II

Using the general procedures of Example I, a nickel-containing product was formed.

Two liters of dioxane containing 0.55 equivalent of polyacrylic acid was combined with two liters of dioxane containing 0.65 mole of nickel hexanoate over a period of 90 minutes at 50° C. A gelatinous mass of pale green precipitate formed and was centrifuged from the bulk of the solvent. The precipitate was washed several times with dioxane to remove unreacted metal salt and then dried to give 68.7 grams of porous powder product containing 17.4% by weight nickel. This product had a surface area of 123 m.$^2$/g., a pore volume of 0.16 cc./g. and median pore diameter of 70 A.

A sample of this nickel product was then thermally decomposed by heating in vacuo for 14 hours at 350° C. and then for two hours at 375° C. A 65% weight loss was noted. The resulting product in accord with this invention was a rigid powder which contained 52.4% by weight nickel, 41.2% by weight carbon and 1.1% by weight of hydrogen. This product had a pore volume equivalent to that of the starting material, that is, 0.15 cc./g.

EXAMPLE III (A) Two copper-containing materials were prepared. Starting material for the first was prepared by combining two liters of dioxane containing 0.66 equivalent of polyacrylic acid with two liters of dioxane containing 1.00 mole of copper hexanoate. The reaction was 140 minutes, the temperature 50° C. 78.0 grams of product was obtained containing 23.0% by weight copper. When pyrolyzed at 295° C. for 7 hours, a 57% weight loss was observed and a final product containing 53.7% by weight copper was formed which had a pore volume of 0.06 cc./g. The second product was formed by combining two liters of dioxane containing 0.35 equivalent of polyacrylic acid with 0.35 mole of copper acetate in 8 liters of dioxane. Here reaction time was 60 minutes and reaction temperatures was 80° C. 30 grams of intermediate product containing 17.6% by weight of copper was separated and then pyrolyzed at 305° C. for 9 hours. The resulting final product contained 36.4% by weight copper in the form of 20 A. particles. It additionally contained 48.8% by weight of carbon and 3.1% by weight of hydrogen. The product surface area was 46 m.$^2$/g. Its pore volume was 0.08 cc./g.

(B) The copper products of part (A) were tested as hydrogenation catalysts. 1.00 gram of the 53.7% by weight copper material was added to 50 mm. of a hydrocarbon mixture containing 42.1% by weight hexene-1, 41.1% by weight cyclohexene and 16.8% by weight n-heptane (hereinafter hydrocarbon mixture A) in a reaction bomb. The bomb was heated to 220° C. and then pressured to 1,060 p.s.i.g. with hydrogen. After 120 minutes, 25% of the olefin in the starting mixture had reacted. Analysis of the final product showed that the hexene-1 had hydrogenated 8 times faster than the cyclohexene.

1.0 gram of the copper product containing 36.4% by weight copper was charged to a bomb containing 50 ml. of a 70% by weight methyl vinyl ketone-30% by weight n-heptane mixture. The bomb was heated to 150° C. and pressured to 1600 p.s.i.g. with hydrogen. After 45 minutes the reaction was stopped and the product analyzed. It contained methyl ethyl ketone, methyl vinyl carbonyl and secondary butyl alcohol in a ratio of about 28:12:1. About 35% of the methyl vinyl ketone charged had reacted.

EXAMPLE IV

A group of multi-metal products were prepared.

(A) Over a 75 minute period, 0.21 equivalent of polyacrylic acid in dioxane was combined with 0.061 mole of cobalt octanoate and 0.14 mole of nickel octanoate. 19 grams of intermediate was recovered. This material had a surface area of 184 m.$^2$/g.

The intermediate was heated in vacuo at 400° C. for 9 hours. The resulting product contained about 50% w. of 50 A. particles of nickel cobalt alloy.

(B) Over a 90 minute period, 0.31 equivalent of polyacrylic acid in dioxane was combined with 0.039 mole of $Ni[Al(C_3H_7O)_4]_2$ in dioxane. 31.1 grams of intermediate was separated and pyrolyzed at 375° C. for 4 hours. The resulting product contained 14.0% w. nickel in the form of 70 A. particles, 15.2% w. aluminum, 46.2% w. carbon and 2.5% w. hydrogen. It had a surface area of 261 m.$^2$/g.

(C) Over a 90 minute period, 0.39 equivalent of polyacrylic acid in dioxane was combined with 0.049 mole of $Cu[Al(C_3H_7O)_4]_2$. Intermediate precipitate was separated and thermally decomposed at 300° C. for 14 hours. It contained 13.2% w. copper, 10.6% w. aluminum, 45.7% w. carbon and 3.2% w. hydrogen. The copper could not be detected by X-ray diffraction indicating that it was as particles of diameters smaller than 50 A.

(D) Over a 100 minute period, 0.20 equivalent of polyacrylic acid in isopropanol was combined with 0.05 mole of zirconium n-butoxide in isopropanol. 20.2 grams of a zirconium-polyacrylate intermediate was recovered having a surface area of 153 m.$^2$/g. and a pore volume of 0.53 cc./g. This product was slurried in ether, 0.8% w. Pt was added as $H_2PtCl_6$, and it was dried. It was then heated at 390° C. for 4 hours. A 47% weight loss was noted. The final product contained 1.6% w. platinum and 48.0% w. zirconium and had a surface area of 175 m.$^2$/g. and a pore volume of 0.43 cc./g.

(E) Over a 10 hours period, 0.42 equivalent of polyacrylic acid in dioxane was combined with 0.14 mole of aluminum isopropoxide and 0.0155 mole of palladium acetate.

43.3 grams of intermediate product was recovered. This material was heated at 250° C. for 12 hours. There was a 16% weight loss. The palladium was present as 200 A. particles.

(F) Materials prepared in accordance with this invention as herein described were tested and found to be useful catalysts for the hydrogenation of hexene-1 and cyclohexene. These tests were carried out using the feedstock of Example II, part (B) (hydrocarbon A) and the apparatus and method of Example II, part (B). The following catalysts were tested:

50.5% w. nickel
49.5% w. cobalt
4.9% w. palladium/11.4% w. aluminum
13.2% w. copper/11.6% w. aluminum
14.0% w. nickel/1.52% w. aluminum
1.6% w. platinum/46.0 w. zirconium All gave acceptable results.

EXAMPLE V

A solution of 30.6 g. (0.15 mole) of aluminum isopropoxide in 10 liters of isopropanol was added to a solution of polyacrylic acid containing 0.45 equivalent of carboxylic acid in 3.0 liters of isopropanol over 1.5 hours at 25–30° C. The resulting slurry was refluxed 15 minutes and then centrifuged. The precipitate as washed in the centrifuge bottles several times with dry isopropanol. Then the solid product was vacuum dried at 80° C. The 37.1 g. of product obtained had a surface area of 312 m.$^2$/g. a pore volume of 0.76 cc./g. and contained 8.4% w. Al.

A portion of this material was pyrolyzed at 1 mm. Hg wth starting increasing temperature up to 410° C. where 6 hours was allowed to complete the decomposition. The resulting product contained 21.9% w. Al but showed no trace of crystallinity by X-ray diffraction.

This aluminum-containing product was tested as a catalyst for the thermolysis of n-octane at 580° C. and gave an array of cracking products showing characteristics of both charcoal and alumina catalysts.

EXAMPLE VI

A mixture of 61.0 g. (0.50 mole) benzoic acid, 1.0 g. of pyrolyzed (cupric acrylate) which contained 40% w. Cu and 5 ml. of benzene was heated to 240–245° C. and oxygen was bubbled through the molten mass at 100 ml./min. for 100 minutes. The reaction mixture was cooled and 30 g. NaOH, 250 ml. H$_2$O and 30 ml. of ethanol were added; then esters in the product were saponified by overnight reflux. Following this the mixture was acidified and saturated with NaCl and Na$_2$SO$_4$; the resulting solution was repeatedly ether extracted. The ether extract contained both recovered benzoic acid (61% recovery) and 5.8 g. of phenol, the latter represented a 32% conversion to phenol based on the unrecovered benzoic acid.

EXAMPLE VII

A polymer was prepared from an ethylenically unsaturated aromatic acid. A solution of 5.7 g. (0.028 mole) of aluminum isopropoxide in 200 ml. of acetone was added to poly[vinyl hydrogen phthalate] (Eastman Chemical) containing 0.053 equivalent of carboxyl groups in 1.0 liter acetone. Addition was made at 40° C. over a period of 45 minutes. After the addition was complete, the mixture containing a white gelatinous precipitate was gently refluxed for one hour. The mixture was then cooled and the gelatinous precipitate removed by filtration. The precipitate was washed twice with fresh acetone and dried at 40° C. in vacuo. The free-flowing material recovered weighted 11.0 g. It had a surface area of 80 m.$^2$/g. and pore volume of 0.20 cc./g. When this product is heated at 400° C. in vacuo for about 4 hours, it decarboxylates. The resulting product would contain aluminum as aluminum oxide and have a similar surface area to the intermediate material.

I claim as my invention:

1. A process for preparing a high surface area, porous, rigid metal or metal oxide-containing organic matrix polymer wherein said metals or metal oxides are present as minute crystals in an organic matrix made up of hydrocarbons, oxyhydrocarbons or mixtures thereof, which comprises thermally decarboxylating at a temperature of at least about 100° C. and a time period of up to about 12 hours a porous organic salt selected from Group IIIb–Va metal salts of polymerized unsaturated hydrocarbon carboxylic acids derived solely from hydrocarbon carboxylic acid monomers possessing from one to two carboxy groups and from one to two ethylene linkages per monomeric unit, which salts have surface areas of at least 10 m.$^2$/g.

2. The process in accordance with claim 1 wherein the porous organic salt is slected from the group consisting of Group IIIb–IVa metal salts of polymerized alkenoic acids of from 3 to 6 carbon atoms.

3. The process in accordance with claim 2 wherein the temperature is in the range from 150° C. to 450° C.

4. The process in accordance with claim 3 wherein the decomposition is carried out in an oxygen-containing atmosphere and the matrix polymer product contains metal oxide.

5. A powder wherein each of the individual particles comprises a rigid organic matrix made up of hydrocarbons, oxyhydrocarbons or mixtures thereof containing at least about 10% by weight of particles of Group IIIb–Va metals or oxides thereof, said organic matrix having a specific surface area of from 10 to 600 m.$^2$/g., and said metal particles being no larger than about 1000 A.

6. A decarboxylated Group IIIb–Va metal salt of polymerized olefinically unsaturated carboxylic acid derived solely from hydrocarbon carboxylic acid monomers possessing from one to two carboxy groups and from one to two ethylenic linkages per monomeric unit which comprises a porous organic matrix made up of hydrocarbons, oxyhydrocarbons or mixtures thereof having at least 25% by weight of 1000 A. or smaller particles of said metals or their oxides at its interstices, said porous organic matrix having a particle size sufficiently fine that a plurality of said organic matrices constitute a powder.

7. The decarboxylated salt in accordance with claim 6 wherein the polymerized olefinically unsaturated carboxylic acid is a polymerized monocarboxylic acid having an average molecular weight of from 500 to 2,000,000.

References Cited

UNITED STATES PATENTS

| | | | |
|---|---|---|---|
| 3,657,166 | 4/1972 | Caldwell | 260—2.5 HA |
| 3,661,813 | 5/1972 | Cronin | 260—2.5 HA |
| 3,222,302 | 12/1965 | Böllert | 260—2.5 D |
| 3,180,844 | 4/1965 | Dickerson | 260—Dig. 31 |
| 3,322,734 | 5/1967 | Rees | 260—Dig. 31 |

OTHER REFERENCES

Chemical Abstract, "Grafted Acrylic Polymers Branched With Metal Containing Polymers," vol. 69, p. 44373c (1968).

WILBERT J. BRIGGS, SR., Primary Examiner

U.S. Cl. X.R.

260—2.5 D, 2.5 R, 2.5 HA, 41 B, 78.4 R, 80 P, 80 L, 96 R, Dig. 31